(12) United States Patent
Finkelstein et al.

(10) Patent No.: US 7,921,116 B2
(45) Date of Patent: Apr. 5, 2011

(54) HIGHLY MEANINGFUL MULTIMEDIA METADATA CREATION AND ASSOCIATIONS

(75) Inventors: Charles A. Finkelstein, Woodinville, WA (US); Gregory D. Finch, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 631 days.

(21) Appl. No.: 11/424,689

(22) Filed: Jun. 16, 2006

(65) Prior Publication Data

US 2007/0294295 A1    Dec. 20, 2007

(51) Int. Cl.
G06F 7/00 (2006.01)
G06F 17/30 (2006.01)

(52) U.S. Cl. ...................................................... 707/746

(58) Field of Classification Search .................. 707/736, 707/746
See application file for complete search history.

(56) References Cited

U.S. PATENT DOCUMENTS

| | | | |
|---|---|---|---|
| 5,630,121 A | 5/1997 | Braden-Harder et al. | |
| 5,764,921 A | 6/1998 | Banham et al. | |
| 5,990,980 A | 11/1999 | Golin | |
| 6,188,831 B1 * | 2/2001 | Ichimura | 386/69 |
| 6,400,996 B1 * | 6/2002 | Hoffberg et al. | 700/83 |
| 6,476,826 B1 * | 11/2002 | Plotkin et al. | 715/723 |
| 6,606,409 B2 | 8/2003 | Warnick et al. | |
| 6,725,268 B1 | 4/2004 | Jackel et al. | |
| 6,782,049 B1 | 8/2004 | Dufaux et al. | |
| 6,892,226 B1 | 5/2005 | Tso et al. | |
| 6,947,598 B2 | 9/2005 | Yogeshwar et al. | |
| 6,956,593 B1 | 10/2005 | Gupta et al. | |
| 6,959,288 B1 | 10/2005 | Medina et al. | |
| 7,010,537 B2 | 3/2006 | Eyal et al. | |
| 7,027,509 B2 | 4/2006 | Jun et al. | |
| 7,131,059 B2 | 10/2006 | Obrador | |
| 7,152,209 B2 | 12/2006 | Jojic et al. | |
| 7,184,959 B2 | 2/2007 | Gibbon et al. | |
| 7,251,413 B2 | 7/2007 | Dow et al. | |
| 7,359,440 B2 | 4/2008 | Zhang et al. | |
| 7,372,991 B2 | 5/2008 | Chen et al. | |
| 2001/0042249 A1 | 11/2001 | Knepper et al. | |

(Continued)

FOREIGN PATENT DOCUMENTS

WO        2005073856 A2      8/2005

OTHER PUBLICATIONS

Wactlar et al.; "Digital Video Archives: Managing through Metadata"; Building a National Strategy for Digital Preservation: Issues in Digital Media Archiving; Apr. 2002; pp. 1-14, printed from http://www.cs.cmu.edu/~hdw/Wactlar_CLIR-final.pdf; National Digital Information Infrastructure and Preservation Program, Library of Congress; U.S.

(Continued)

*Primary Examiner* — Hosain T Alam
*Assistant Examiner* — Van H Oberly
(74) *Attorney, Agent, or Firm* — Senniger Powers LLP

(57) ABSTRACT

Systems and methods for generating temporal metadata for a media source as a function of detected content. An analysis engine detects content within a media stream of a media source. A metadata creation engine generates temporal metadata as a function of the detected content. The generated temporal metadata may be used to create a media log for the media source, generate metadata subsequent detected content and to compare to media sources.

15 Claims, 4 Drawing Sheets

U.S. PATENT DOCUMENTS

| | | | |
|---|---|---|---|
| 2002/0161747 | A1 | 10/2002 | Li et al. |
| 2003/0028889 | A1 | 2/2003 | McCoskey et al. |
| 2003/0032033 | A1* | 2/2003 | Anglin et al. ............... 435/6 |
| 2003/0093792 | A1 | 5/2003 | Labeeb et al. |
| 2004/0001161 | A1* | 1/2004 | Herley ............... 348/465 |
| 2004/0212637 | A1 | 10/2004 | Varghese |
| 2005/0033758 | A1* | 2/2005 | Baxter ............... 707/100 |
| 2005/0114357 | A1* | 5/2005 | Chengalvarayan et al. .. 707/100 |
| 2005/0200762 | A1 | 9/2005 | Barletta et al. |
| 2005/0216454 | A1* | 9/2005 | Diab et al. ............... 707/3 |
| 2005/0244146 | A1 | 11/2005 | Tsumagari et al. |
| 2005/0246375 | A1 | 11/2005 | Manders et al. |
| 2006/0242016 | A1 | 10/2006 | Chenard |
| 2007/0035664 | A1 | 2/2007 | Kamada et al. |
| 2007/0078712 | A1 | 4/2007 | Ott, IV et al. |
| 2007/0255755 | A1 | 11/2007 | Zhang et al. |
| 2007/0282908 | A1 | 12/2007 | Van der Meulen et al. |
| 2008/0163287 | A1 | 7/2008 | Fernandez |

OTHER PUBLICATIONS

DSTC Project Proposal: MAENAD (V2.0); "Multimedia Access for Enterprises across Networks and Domains"; Oct. 15, 1999; 6 pgs.; printed from http://archive.dstc.edu.au/RDU/staff/jane-hunter/Maenad.html, U.S.

Tandberg Television; "Xport(TM) Digital Media Solutions Xport Producer"; Mar. 2005-ver01; 2 pgs; printed from http://www.tandbergtv.com/public/site/Primary/productdocs75/Xport%20Producer_03-05.pdf; U.S.

Amato et al.; "MILOS: A multimedia Content Management system for Multimedia Digital Library Applications"; 4 pgs; printed from http://www.nmis.isti.cnr.it/amato/papers/IRCDL.pdf; U.S. Sep. 12-17, 2004.

"Virage, Visionary Rich Media Management"; 2006; 2 pgs; printed from http://www.virage.com/content/products/; Autonomy Systems; U.S.

"You Tube Broadcast Yourself"; 2006; 2 pgs; printed from http://www.youtube.com/T/explore_create; YouTube, Inc.; U.S.

"What is Flickr?" 2006; 6 pgs; printed from http://flickr.com/Learn_more.gne; Yahoo! Inc.; U.S.

"Datasheet VideoLogger Automate Video Encoding and Indexing"; 2 pgs; promotional material from Virage, Inc.; San Mateo, California, 2005.

* cited by examiner

HIGHLY MEANINGFUL MULTIMEDIA METADATA CREATION AND ASSOCIATIONS

BACKGROUND

The common practice known as "logging" a media source (e.g. a video tape), is a human intensive, mostly manual process. The "logger" views the media source from time A to time B, writing down words that describe the content to create a log. The log is a text document of data or metadata describing the audio, video and image contents in the media source, at specific times between points A and B. A typical use of the log is a video editor looking for specific contents based on the descriptions (data and metadata) in the log, then extracting the desired contents from the media source to make a new video. Another use may for a broadcaster to locate places in the media source to insert appropriate advertising.

Currently, a number of applications are available to detect particular types of content within a media stream. The following are just a few of the currently available applications: face detection, dynamic image peak detection, color value detection, dynamic image change detection face recognition, music beats detection, audio fingerprint detection, dynamic peaks detection, speech detection, word and phrase detection.

SUMMARY

Embodiments of the invention include systems and methods for generating temporal metadata for a media source. In an embodiment, the invention includes an analysis engine for detecting content within the media source and a temporal metadata creation engine for creating temporal metadata for the media source as function of the detected content.

In accordance to another aspect of one embodiment of the invention, temporal metadata is generated for a first detected content of a media source. A second detected content is detected from the media source and second temporal metadata is generated as a function of the second detected content and the first generated metadata.

In accordance to yet another aspect of one embodiment of the invention, two media sources are compared as a function of their generated temporal.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
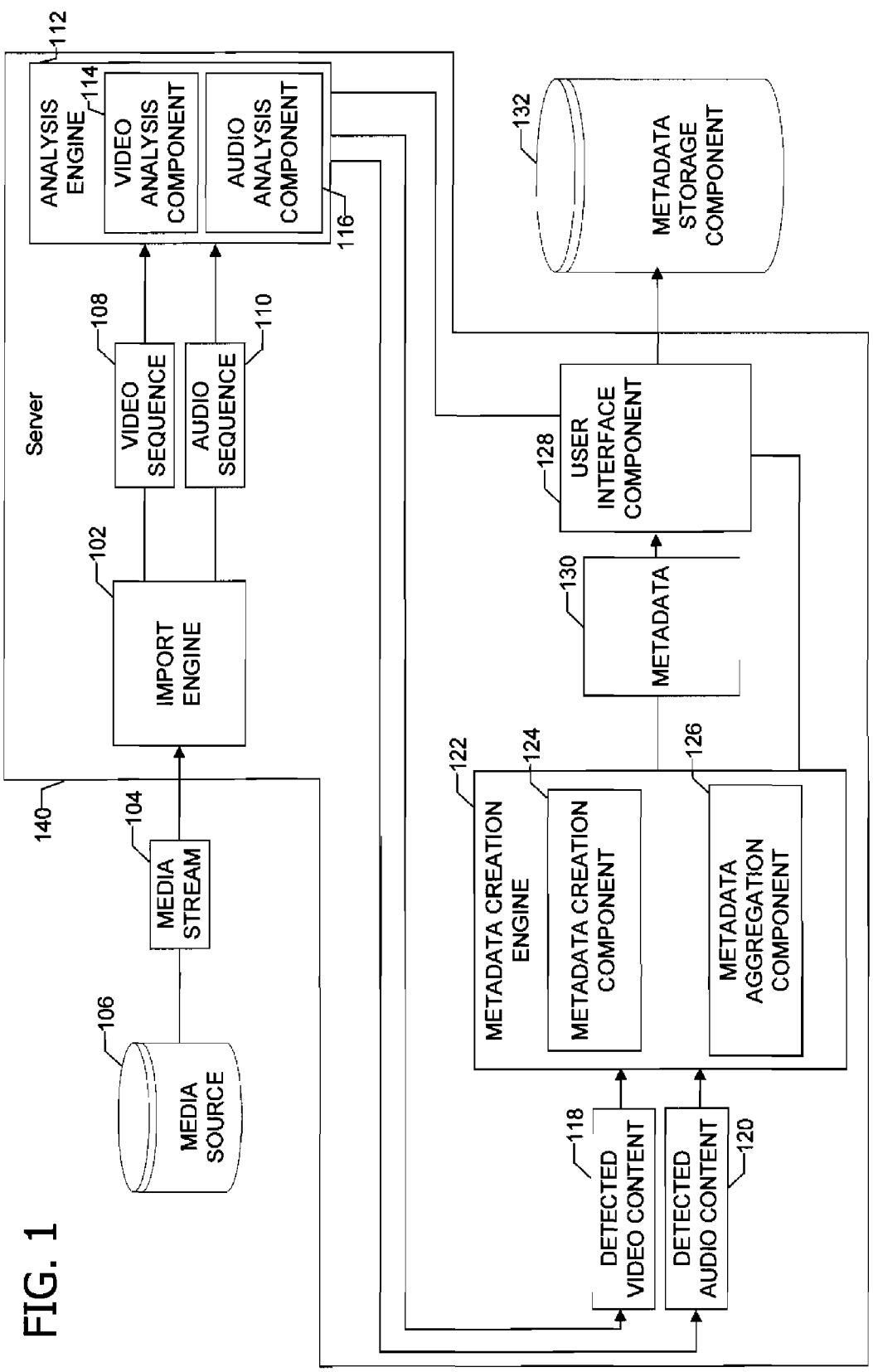
FIG. 1 is a block diagram illustrating one example of a suitable computing system environment in which the invention may be implemented.

FIG. 1 is of an exemplary computing environment for one embodiment of the invention. An import engine 102 accepts a media stream 104 from a media source 106. The media source 106 is a file or a device capable of generating the media stream 104. In one embodiment, the following devices generate the media stream 104: an audio recorder, a video camera, a digital camera, a web camera, a computer and other devices such as cellular phones and digital music players that are capable of recording digital audio and/or video. Video includes both motion video and still images. The media source 106 includes one or more of the following: a motion video, a motion video with sound, a sound recording or a digital photograph.

The import engine 102 generates one or media sequences from the media stream. In one embodiment, the import engine generates one or more of the following: a video sequence 108 and an audio sequence 110. The media sequence is then directed to an analysis engine 112.

The analysis engine 112 utilizes one or more components to detect content within the media sequence. In one embodiment, the analysis engine 112 may deactivate one or more components according to the type of media stream being analyzed. For example, if a sound recording is being analyzed, then any video analysis components 114 may be bypassed to improve system performance The analysis engine 112 includes one or more of the following: a video analysis component 114 and an audio analysis component 116. The video analysis component 114 detects video content 118 from the video sequence 108. The video analysis component 114 includes one or more of the following: dynamic image peaks detection, dynamic image change detection, face detection, face recognition, color value detection and image pattern recognition.

The audio analysis component 116 detects audio content 120 from the audio sequence 110. The audio analysis component 116 includes one or more of the following: music beat detection, dynamic peaks detection, speech detection, word and phrase detection, word boundary detection and audio fingerprint detection.

The detected video content 118 and detected audio content 120 are input into the metadata creation engine 122. The metadata creation engine 122 creates temporal metadata 128 or the "log" for the media stream 106 as a function of the detected content. For example, suppose the video analysis component 114 of the analysis engine 112 includes a face detection component and the component has detected a face from time code 11.22.33 to 11.23.31 in the video sequence 108. The time code data and the detected face are input to the metadata creation component 124 of the metadata creation engine 122 to generate metadata 130. In one embodiment, the metadata generated includes the time code data, a video thumbnail of the face of a particular person, a still thumbnail of the face of the particular person, and the name of the particular person.

In one embodiment, the metadata creation engine 122 includes a metadata aggregation component 126. The metadata aggregation component aggregates the metadata for the media sequence. For example, if the video component of the analysis engine detected the face of "Julie" in the video sequence and the audio component detected the phrase "Happy Birthday, Julie!" in corresponding audio sequence, the metadata generated includes: the keywords "Julie" and "Birthday", a still image thumbnail of Julie's face and the audio thumbnail "Happy Birthday, Julie!" The metadata aggregation component would associate the generated metadata with the time codes corresponding to the media sequence within the media source.

In another embodiment, a user interface 128 allows a user to supply information regarding the detected content. For example, the video analysis component 114 may detect a unique person based on facial characteristics, but is unable to identify the person. The user interface 128 allows the user to identify the person. The metadata 130 generated by the metadata creation component 122 will include the user supplied information. Once the person is identified, the video analysis component 114 and the metadata creation engine 122 will have access to this metadata to generate additional metadata in later detected content for this person from the same media stream 104 or a new media stream.

In one embodiment, the metadata 130 includes one or more of the following: alpha numeric text, motion video thumbnails, audio thumbnails, still image thumbnails and time code data. A thumbnail is a miniature or shortened version of the detected content that is representative of the detected content. The time code data is information that links the metadata to the particular segment of the media stream 104.

In another embodiment, the metadata is displayed to the user via the user interface component 128. The user is given an opportunity to modify the metadata of the detected content. In yet another embodiment, the user can specify threshold values for the analysis engine 112 via the user interface component 128 to re-run the analysis to detect content from the media sequence. For example, suppose the face recognition component of the analysis engine 112 detected the face of "Ada" in the video sequence. However, when the user viewed the metadata, the user determined that person in the video was Ada's sister, Helena. The user can adjust the threshold values for the face recognition component via the user interface component 128 and re-run the analysis until the face recognition component can distinguish "Ada" from "Helena".

The metadata storage component 132 stores the generated metadata 130. In one embodiment, the metadata storage component 132 stores the metadata 130 in a searchable database format. In this embodiment, the user accesses the user interface component 128 to enter keywords to search the metadata to locate a media source of interest. In response to the search, the user interface component 128 will display a listing of metadata corresponding to media sources with metadata that include the entered keyword. From this listing, the user can view/listen to the thumbnails of the metadata to select a desired media source. Because the metadata is associated with the time code data from the media source, the user can directly access to the segment of the media source that contains the selected content. In another embodiment, the metadata is stored as a media log.

In yet another embodiment, the metadata 130 is in a format compatible with one or more of the following: multimedia editing applications, media asset management applications and online video repositories to aid in searching and finding desired content (e.g. tagging). In yet another embodiment, the metadata 130 is generated in a format so that it may be embedded into the media stream. For example, the analysis engine 112 may include a speech recognition component provides text metadata corresponding to the words and phrases detect in the audio sequence. The metadata 130 is generated in a format compatible with closed captioning and the closed captioning metadata is then be embedded into the original media stream to create a new media source that includes the closed captioning. In another embodiment, the speech recognition component may be utilized to create and embed subtitles.

FIG. 1 shows one example of a general purpose computing device in the form of a server 140. In one embodiment of the invention, a computer such as the server 140 is suitable for use in the other figures illustrated and described herein. Server 140 has one or more processors or processing units and a system memory. The server 140 typically has at least some form of computer readable media. Computer readable media, which include both volatile and nonvolatile media, removable and non-removable media, may be any available medium that may be accessed by server 140.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by server 140.

Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The computer 140 may also include other removable/non-removable, volatile/nonvolatile computer storage media. Removable/non-removable, volatile/nonvolatile computer storage media that may be used in the exemplary operating environment include, but are not limited to, hard disk drives, magnetic disk drives, optical disk drives, magnetic tape cassettes, flash memory cards, digital versatile disks, digital video tape, solid state RAM, solid state ROM, and the like.

The drives or other mass storage devices and their associated computer storage media discussed above provide storage of computer readable instructions, data structures, program modules and other data for the server 140. A user may enter commands and information into server 140 through input devices or user interface selection devices such as a keyboard and a pointing device (e.g., a mouse, trackball, pen, or touch pad). Other input devices may include a microphone, joystick, game pad, satellite dish, scanner, or the like. A monitor or other type of display device is also connected to system bus via an interface, such as a video interface.

Generally, the data processors of server 140 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including server 140, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, server 140 executes computer-executable instructions such as those illustrated in the figures to implement aspects of the invention.

Figure 2:
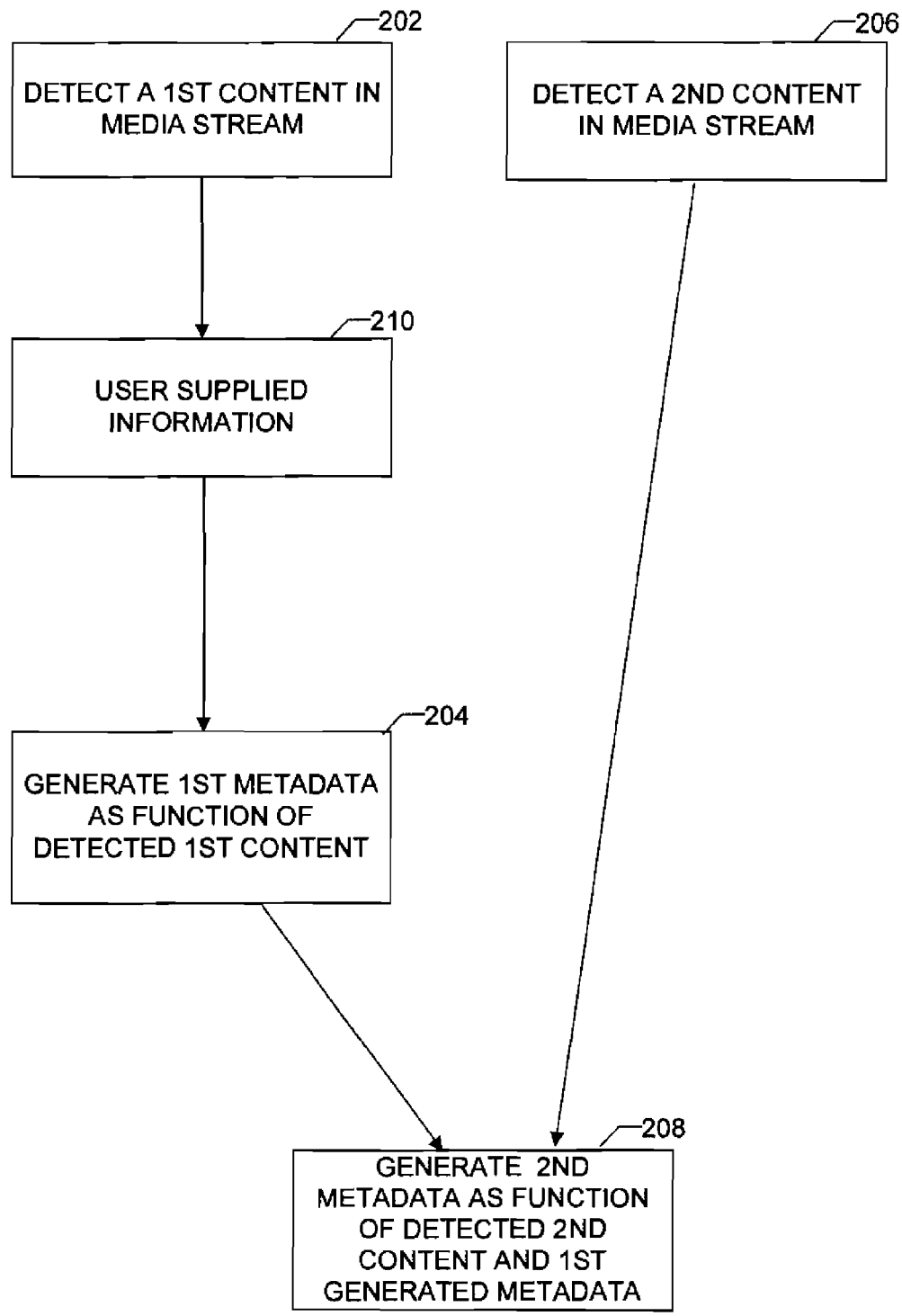
FIG. 2 is an exemplary flow diagram of a method for generating temporal metadata according to one embodiment of the invention.

FIG. 2 is a flow diagram of one embodiment of a method for creating temporal metadata. At 202, a first content is detected in a media stream. In one embodiment, the first content is detected by the analysis engine 112. At 204, a first metadata is generated for the first detected content as a function of the first detected content. In one embodiment, the metadata is created by the metadata creation engine 120 and includes one or more of the following: alpha numeric text, motion video thumbnails, audio thumbnails, still image thumbnails and time code data. In another embodiment, a user identifies the first detected content and the first metadata is generated as a function of the first detected content and the user identification.

At 206, a second content is detected either sequentially, simultaneously or partially overlapping with the detection of the first content at 202. In one embodiment, the second content is from the same media stream as the first content. In another embodiment, the second content is from a different media stream than the first content. The second content shares one or more characteristics with the first content. For example, suppose a talking parrot, Polly, is identified in the first content. The image pattern of the parrot, Polly, is detected in the video sequence associated with the first content and the voice pattern of the parrot is detected in the audio sequence associated with the first content. The first metadata includes the time code for the second sequence, the text "Polly the parrot", a still image of Polly, an audio thumbnail of Polly speaking and a video thumbnail of Polly. Later, another sequence, the image pattern of the pattern of the parrot, Polly, is detected within the second content. In this case, the common characteristic between the first and second content is the image pattern of Polly, the parrot.

At 208, a second metadata is generated for the second detected content as a function of the second detected content and the metadata generated for the first content. In one embodiment, the metadata is created by the metadata creation engine 120 and includes one or more of the following: alpha numeric text, motion video thumbnails, audio thumbnails, still image thumbnails and time code data. Continuing with the example above, the second metadata would include the time code for the second sequence, the text "Polly the parrot", a still image of Polly, and a video thumbnail of Polly.

In another embodiment, at 210, the user supplies information regarding the first detected content. For example, music is detected in the first content by a music beat detection component, but the name or type of the music is unknown. The user provides the song title and the metadata created for the first content includes the song title. When the same music is detected in the second content, the metadata for the second content will include the song title. Advantageously, this allows a user train the system so that once a pattern (voice, music, image, etc) has been identified by the user, the metadata associated with that pattern can be used to generate metadata for the detected pattern in subsequent sequences.

Figure 3:
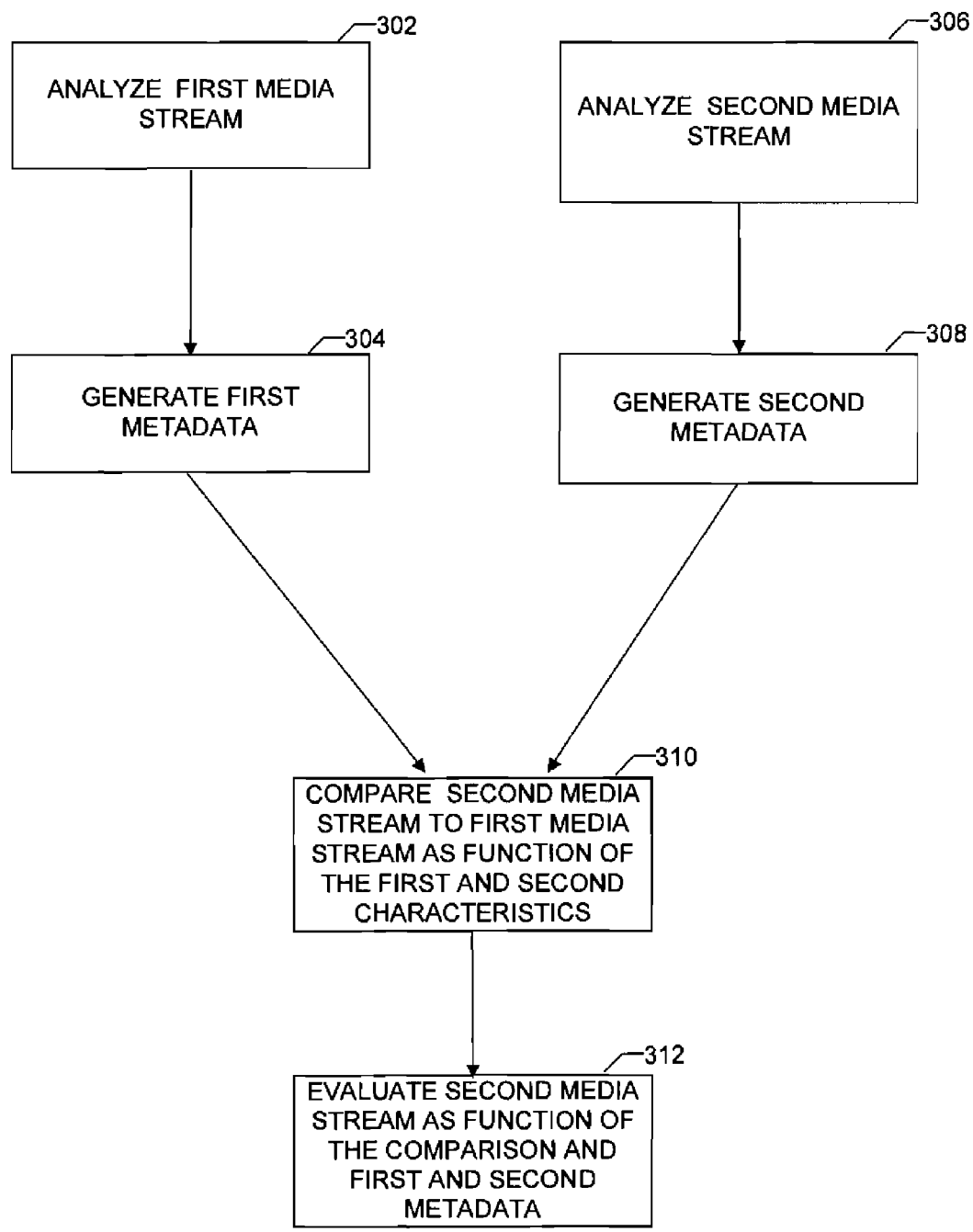
FIG. 3 is an exemplary flow diagram of a method for comparing media streams according to one embodiment of the invention.

FIG. 3 is a flow diagram of one embodiment of a method for comparing two media streams. At 302, a first media stream analyzed. In one embodiment, an analysis engine 112 detects audio content 120 and video content 118 within the media stream 104.

At 304, a first metadata is generated for the first media stream as a function of the first detected content. In one embodiment, the metadata is created by the metadata creation engine 120 and includes one or more of the following: alpha numeric text, motion video thumbnails, audio thumbnails, still image thumbnails and time code data. In another embodiment, a user identifies the first detected content and the first metadata is generated as a function of the first detected content and the user identification.

At 306, a second media stream is analyzed to detect content either sequentially, simultaneously or partially overlapping with the analysis of the first media stream at 302. At 308, a second metadata is generated for the second media as a function of the second detected content. At 310, a comparison is made of the first and second media streams as a function of a characteristic of the detected content.

At 312, an evaluation is made of the first media stream to the second media stream as a function of the comparison and the first and second metadata. In one embodiment, the evaluation of the first and second media streams to indicates one or more of the following in the second media stream: adult language, adult video content, a location to insert advertisement, a viewer rating and copyright infringement. For example, suppose metadata is generated for a particular copyrighted musical composition. The analysis engine 112 then detects that copyrighted musical composition in the second content using at least one of the following: beat detection, voice recognition and an audio fingerprint. Once detected, the metadata creation engine 122 can generate metadata for second content and indicate that a potential copyright violation may exist in the second content.

Figure 4:
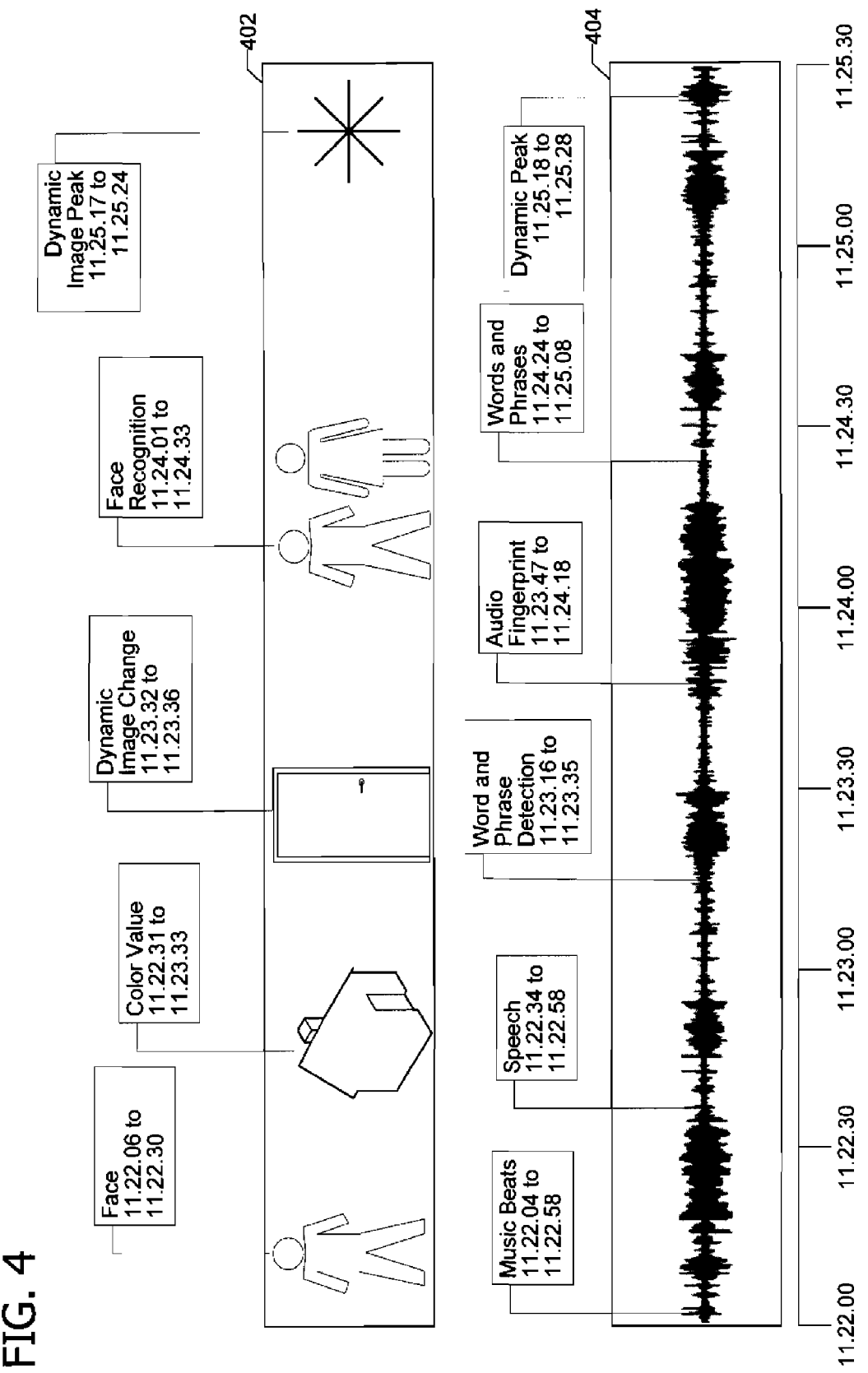
FIG. 4 is an exemplary flow diagram illustrating one embodiment of an exemplary video sequence and audio sequence for a media stream.

In FIG. 4, a flow diagram illustrating an exemplary video sequence 402 and audio sequence 404 for a media stream is shown. The video analysis components 114 of the analysis engine 112 detects content within the video sequence 402. At least one of the following components are used to detect video content: a face detection component, a face recognition component, dynamic image change component, dynamic image peak component and a color value component. These video analysis components 114 are known to one skilled in the art and can be used to detect content within the video sequence 402. For example, in the illustrated video sequence 402 the following content is detected: a face is detected by the face detection component from time code 11.22.06 to 11.22.30; a color value associated with blue sky is detected from time code 11.22.31 to 11.23.03; a dynamic image change indicating movement from outdoors to indoors is detected from time code 11.23.32 to 11.23.36; the face of "Julie" is detect by a face recognition component from time code 11.24.01 to 11.24.33; and a dynamic image peak is associated with a flash of light is detected from time code 11.25.17 to 11.25.24.

Similarly, a number of audio analysis components 116 may used to detect audio content from the illustrated audio sequence 404, these components include at least one of the following: a music beat detection component, a speech detection component, word and phrase detection component, dynamic peak detection component and a audio fingerprint component. These audio analysis components are known to one skilled in the art and are used to detect content within the audio sequence 404. For example, in the illustrated video sequence 404 the following content is detected: music is detected by the music beats detection component from time code 11.22.04 to 11.22.58; the speech "Happy" is detected by the speech detection component from time code 11.22.34 to 11.22.58; word and phrase detection indicating speaking gaps is detected from time code 11.23.16 to 11.23.35; the audio fingerprint associated with the song "Happy Birthday" is detected from time code 11.23.47 to 11.24.18; the audio fingerprint associated with people laughing is detected from time code 11.24.24 to 11.25.08 and a dynamic peak associated with a firecracker is detected from time code 11.25.18 to 11.25.28.

Once the content has been detected by the analysis engine 112, the metadata creation engine 122 creates metadata 130 for the content. For example, metadata generated for the song "Happy Birthday" includes the keywords "Happy Birthday" and "Birthday" and an audio thumbprint of the song associated with the time code 11.23.47 to 11.24.18.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for creating temporal metadata from a media source comprising:
    an import engine for obtaining a media stream from the media source, said media stream including content recorded by the media source, said import engine generating a media sequence from the media stream;
    a user interface for receiving user-identified content corresponding to the generated media sequence wherein the user provides metadata identifying the content of the generated media sequence, said user-identified content comprising content discernable to the user during rendering of the media sequence;
    an analysis engine for automatically analyzing the user-identified content within the media sequence without user interaction, said analysis engine comprising the following components: music beat detection, audio dynamic peaks detection, speech detection, word boundary detection, word and phrase detection and audio fingerprint detection, wherein said analysis engine components analyze the audio content of the user-identified content within the media sequence, said word and phrase detection component generating text metadata corresponding to words and phrases detected in the analyzed user-identified content;
    a temporal metadata creation engine for automatically creating temporal metadata for the media sequence without user interaction as a function of the user-provided metadata for the user-identified content and the analyzed user-identified content, said creation engine automatically determining a location within the media stream suitable for inserting an advertisement into the media sequence without user interaction as a function of the created temporal metadata; and
    a metadata storage component for storing the temporal metadata and the generated text metadata for the media source in a searchable database, said searchable database including information indicating the determined location in the media file suitable for inserting an advertisement.

2. The system of claim 1, further comprising a user interface component for modifying a threshold setting of the analysis engine, modifying the created temporal metadata, and searching the stored temporal metadata.

3. The system of claim 1, wherein the media stream comprises at least one of the following types: an audio stream, a video stream and a still video stream.

4. The system of claim 1, wherein the media sequence comprises at least one of the following types: an audio sequence, a video sequence and a still video sequence.

5. The system of claim 1, wherein the media source comprises at least one of the following: a motion video without sound, a motion video with sound, a sound recording and a digital photograph.

6. The system of claim 1, wherein the media source is generated by at least one of the following: a digital camera, a cellular phone, a sound recorder, a video camera, a scanner, a computer, a digital video recording device and a digital audio player.

7. The system of claim 1, wherein the analysis engine further comprises at least one of the following components: dynamic image peaks, dynamic image change detection, and image pattern recognition.

8. The system of claim 1, wherein one of the components of the analysis engine is bypassed as a function of the type of media sequence.

9. The system of claim 1, wherein the metadata comprises at least one of the following: alphanumeric text description of the detected content, motion video thumbnails of the detected content, audio thumbnail of the detected content, and still thumbnail of the detected content.

10. The system of claim 1, wherein the automatically created temporal metadata corresponds to at least one of closed captioning and subtitles.

11. The system of claim 1, wherein the searchable database includes information indicating a location of adult content.

12. The system of claim 1, wherein the temporal metadata creation engine aggregates the metadata of the detected content for the media sequence and generates a log for the media source as a function of the aggregated metadata.

13. The system of claim 1, further comprising a metadata tagging component for creating metadata compatible with at least of the following: online video repositories and media asset applications.

14. A method of comparing a first media stream and second media stream comprising:

providing a first media stream comprising a first content discernable during rendering of the first media stream;

providing a second media stream comprising a second content discernable during rendering of the second media stream, wherein the second content is different than the first content;

analyzing the first media stream for the first content within the first media stream;

determining a first characteristic of the analyzed first content;

generating a first set temporal metadata based on the analyzed first content;

analyzing the second media stream for the second content within the second media stream;

determining a second characteristic of the analyzed second media stream;

generating a second set temporal metadata based on the analyzed second content; comparing the first media stream to the second media stream as of function of the first characteristic of the first media stream and the second characteristic of the second media stream;

providing an evaluation to detect copyright infringement of the analyzed first content of the first media stream by the analyzed second content of the second media stream as a function of the comparison, the first set of temporal metadata and the second set of temporal metadata, said evaluation to detect copyright infringement including one or more of the following: beat detection within the analyzed first content and the analyzed second content, voice recognition within the analyzed first content and the analyzed second content, and an audio fingerprint comparison of the analyzed first content and the analyzed second content, said provided evaluation comprising information indicating a similarity indicative of copyright of the first content by the second content; and including in the second set temporal metadata information indicating the appropriate location in the second stream to insert the advertisement; and inserting an advertisement into the second media stream according to the included temporal metadata.

15. The method of claim 14, wherein at least one of the first characteristic and the second characteristic indicates at least one of the following: a viewer rating, and an adult content.

* * * * *